United States Patent
Fedigan et al.

(10) Patent No.: US 7,023,770 B2
(45) Date of Patent: Apr. 4, 2006

(54) ENCODING RATE-BASED, PROGRAMMABLE, LINEAR VELOCITY, COMPRESSED AUDIO COMPACT DISC PLAYER

(75) Inventors: Stephen J. Fedigan, Dallas, TX (US); Thomas N. Millikan, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 450 days.

(21) Appl. No.: 10/242,480

(22) Filed: Sep. 12, 2002

(65) Prior Publication Data

US 2004/0052175 A1 Mar. 18, 2004

(51) Int. Cl.
*G11B 7/00* (2006.01)
(52) U.S. Cl. ............... 369/47.33; 369/47.44; 369/59.25
(58) Field of Classification Search ............. 369/47.47, 369/47.31, 47.19, 47.28, 47.48, 47.54, 47.33, 369/47.44, 59.25, 53.22
See application file for complete search history.

(56) References Cited

U.S. PATENT DOCUMENTS

| | | | | |
|---|---|---|---|---|
| 4,603,412 A | | 7/1986 | Yamazaki | 369/50 |
| 5,255,132 A | * | 10/1993 | Galbraith et al. | 360/51 |
| 5,325,347 A | * | 6/1994 | Sako | 369/47.3 |
| 5,379,120 A | * | 1/1995 | Honjo | 386/122 |
| 6,753,667 B1 | * | 6/2004 | Sakamoto | 318/433 |
| 6,801,489 B1 | * | 10/2004 | Abe et al. | 369/47.33 |
| 6,816,972 B1 | * | 11/2004 | Kutaragi et al. | 713/200 |

* cited by examiner

*Primary Examiner*—Hoa T. Nguyen
*Assistant Examiner*—Van T. Pham
(74) *Attorney, Agent, or Firm*—Robert D. Marshall, Jr.; W. James Brady, III; Frederick J. Telecky, Jr.

(57) ABSTRACT

An audio player permits compressed or uncompressed audio CDs to be played. The preferred player includes a spindle motor control that causes the CD to be spun at a constant linear velocity that is commensurate with the encoding rate of the file being played. In this manner, the data can be continuously pulled of the CD at just the right rate so that, after being decoded and decompressed, the data can be played. The player also dynamically adjusts its constant linear velocity to the encoding rate of the file being played to permit files on the same disc having different encoding rates to be played.

17 Claims, 2 Drawing Sheets

ENCODING RATE-BASED, PROGRAMMABLE, LINEAR VELOCITY, COMPRESSED AUDIO COMPACT DISC PLAYER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a compact disc ("CD") player. More particularly, the invention relates to a compressed audio disc player that spins a disc at a constant linear velocity that is keyed to the encoding rate of the compressed audio. Still more particular, the invention relates to an encoding rate-based, programmable linear velocity compressed audio disc player.

2. Background of the Invention

In recent years, audio compact discs ("CDs") and CD players have grown in popularity. A conventional CD stores audio in a digital format on the disc. The digital data is accessed by an optical pickup mechanism in the player as the CD is rotated adjacent the optical pickup. The player includes electronics such as a motor, motor drive and control circuitry, decoder logic, and the like to spin the CD at an appropriate speed, read the data off the CD, process the data, and convert it to an analog format to be played through a speaker or headphones.

The circuitry in a conventional CD players spins the CD at a constant linear velocity ("CLV"). The data is stored on the CD in a generally spiral track with each bit on the track spaced at an equal distance from adjacent bits. Audio on a conventional audio CD has been digitized, but not compressed. The CD is spun at a rate that permits the optical pickup to extract data from the CD into a bit stream that matches the rate at which the audio data must be played through a speaker. That is, if X number of bits of digital data represents one second of live audio, then the CD is spun at a rate that permits a bit stream to be created by the optical pickup that comprises X bits per second. This X bits per second bit stream can then be piped through a speaker. The equal spacing of bits on the spiral track requires the rotation speed of the CD to decrease as the optical pickup spirals away from the center of the disc.

Because conventional audio CDs do not store data in a compressed format, a single CD typically can hold about 67 minutes of audio. It is desirable, of course, to be able to store much more audio on a CD and, in general, as much as possible. To that end, compression techniques have been implemented to compress digital audio data and store such data in a compressed format on a CD. The well known "MP-3" compression standard is becoming popular for enabling CDs to contain much more audio than a conventional CD. MP-3 compression ratios of, for example, 10:1 can be obtained to permit ten times more audio to be stored on a single MP-3 CD than on a conventional (i.e., uncompressed) CD.

Although permitting much more audio to be stored on a CD is highly advantageous, it is not problem-free. For instance, the same electronic drive and control electronics are often used in MP-3 players as were used in conventional CD players. This means that an MP-3 CD is rotated at the same constant linear velocity as was a conventional CD. However, the bit stream coming off the disc is compressed and thus represents more audio than the bit stream from a conventional audio CD. In a conventional CD player, the disc is rotated at the CLV so as to produce a 1.44 megabits per second and that 1.44 megabits represents one second of live audio. Each second, however, in the bit stream from an MP-3 CD spun at the same CLV represents more than one second of live audio (e.g., ten seconds of live audio) because the data is compressed. In general, data is being pulled off an MP-3 CD at a faster rate than it is being consumed (e.g., played through a speaker).

This problem has been addressed by adding memory and other logic into the player to be able to store the data coming off the disc into a relatively large memory buffer and playing the data from the buffer. Once the buffer becomes full, the player pauses the optical pickup mechanism to stop reading data off the disc. The player continues pulling data out of the buffer to be consumed. Once the amount of unconsumed data in the buffer falls below a threshold, the player's optical pickup is re-activated to resume reading more data off the disc to again fill up the buffer. Thus, rather than extracting data from the CD at a constant rate (i.e., the rate at which it is consumed), the data is extracted from the CD in shorter duration bursts.

Although this approach is generally satisfactory, it suffers from two deficiencies. First, the extra hardware necessary to implement this approach is significant. The memory buffer in which the compressed data is burst loaded from the CD must be significantly large which requires extra battery power (in the context of portable player), space, and adds significant cost as well. Second, during a pause, the optical mechanism is held fixed by applying a constant voltage to the spring-loaded radial voice coil actuator. The player may be bumped during the pause time period thereby moving the optical pickup relative to the CD. Thus, after a pause, when the optical mechanism is to begin reading more data off the CD, the exact location at which the mechanism left off must be located and the optical mechanism must be moved to that location. The process of moving the optical mechanism to the correct location on the CD is called a "re-seek." The re-seek process consumes power which is not desirable, particularly for battery operated devices. Accordingly, a solution to these problems would be highly desirable.

BRIEF SUMMARY OF THE PREFERRED EMBODIMENTS OF THE INVENTION

The preferred embodiments of the present invention solve the problems noted above by providing an audio player that permits compressed or uncompressed audio CDs to be played by pulling data off the CD at just the rate it needs to be consumed. The preferred player includes a spindle motor control that advantageously causes the CD to be spun at a constant linear velocity that is commensurate with the encoding rate of the file being played. This means that if a compressed audio CD is being played, the disc will be spun at a CLV that is slower than the CLV for an uncompressed audio CD. In this manner, the data can be continuously pulled off the CD at just the right rate so that, after being decoded and decompressed, the resulting data rate is equal to the rate at which the data should be consumed. Notably, the problems discussed above in having to burst fill a buffer, stop the disc, performing re-seek operations, etc. are avoided.

Not only is the spindle control loop able to spin the disc at a CLV that takes into account the encoding rate of the data, the spindle control loop preferably also is programmable permitting the disc to be spun at any one of a plurality of CLVs. By permitting the CLV to be programmable, the spindle control loop can be programmed to play compressed audio files having varying encoding rates.

In accordance with one embodiment of the invention, the player includes an optical pickup, processing logic coupled to the optical pickup that receives a compressed bit stream from the optical pickup, a programmable motor control coupled to the processing logic, and a motor coupled to said programmable motor control and adapted to spin an audio disc at a rate determined by the programmable motor control. The processing logic determines the encoding rate of compressed audio on the disc and programs the programmable motor control to spin the disc at a constant linear velocity that is a function of the encoded rate of the compressed audio.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, different companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

Figure 1:
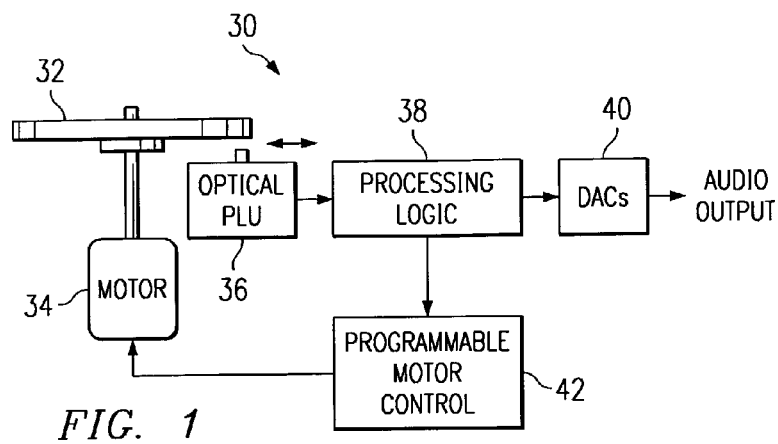
FIG. 1 shows a preferred embodiment of a compressed CD player that implements a programmable CLV that is keyed to the encoding rate of the compressed audio file being played.

Referring to FIG. 1, in accordance with a preferred embodiment of the invention, a compressed audio CD player system 30 accesses compressed data stored on a CD 32. The player includes a motor 34 which spins the CD 32, an optical pickup 36, processing logic 38, digital-to-analog converters ("DACs") 40, and a programmable motor control 42. Other components (not shown) may be included as well. The CD 32 spins by action of the spindle motor 34. Optical pickup 36, as one of ordinary skill in the art would know, reads data off the CD as it spins adjacent the optical pickup. The optical pickup 36 produces an analog signal in which digital compressed audio from the CD is encoded. The motor 34 causes the CD 32 to spin at a rate that is controlled by programmable motor control 42. Programmable motor control 42, in turn, is controlled by processing logic 38 which receives the compressed audio signal from the optical pickup 36. The processing logic 38 includes analog-to-digital converters, comparators, and other known components to convert the compressed audio signal to a digital bit stream signal, recover the clock embedded in the signal, decompress the digital bit stream, and provide the decompressed bit stream to the DACs 40. DACs 40 convert the decompressed bit stream back to an analog signal and provide such analog signal as an output audio signal. The output audio signal then can be provided to an audio driver for driving a speaker or headphone. The audio driver and speaker/headphones have not been specifically shown for sake of clarity in explaining the preferred embodiment of the invention.

In accordance with the preferred embodiment of the invention, the processing logic 38 determines the encoding play rate of the compressed audio data contained on the CD 32. The encoding play rate is the rate at which the data, after being decompressed, should be played to reproduce the original audio signal. The encoding rate of each file on the CD is stored in the file itself, although such need not be the case. In general, the encoding rate should be accessible at some location on the disc or at least be determinable in any suitable manner from information on the disc.

Regardless of how the encoding rate is obtained or otherwise determined, the processing logic 38 uses the encoding rate of each file to determine how fast to spin the CD 32 when playing a file so that the data coming off the CD, after being decompressed, is at the rate at which the data should be consumed. As noted, the processing logic 38 obtains the encoding rate for each file from the CD itself. In general, different files may contain audio data that may have been encoded at different encoding rates. Thus, the CD 32 should be spun at different constant linear velocities for such files and, more specifically, at the rate commensurate with the encoding rate of each file. For example, if a particular compressed audio file has an encoding rate that is one-tenth the rate of a conventional (i.e., uncompressed) audio CD, the player 30 will cause the disc to spin at a CLV that is one-tenth the CLV that is used to play a conventional audio CD. The processing logic 38 provides signals to the programmable motor control 42 to cause the motor 34 to spin the CD 32 at the appropriate encoding rate for the file being played.

The embodiment described above with regard to FIG. 1 describes a CD player that spins a CD at a constant linear velocity while playing a particular compressed file, but matches the velocity to the file by programmable motor control 42. As a result, the player 30 spins the disc 32 at a slower rate for a compressed audio file, and at a rate that is corresponds to the rate at which the data coming off the disc should be consumed (played) after being decompressed. The CLV used is commensurate with the encoding rate of the compressed audio and is programmable by the processing logic 38. One of ordinary skill in the art will appreciate that numerous embodiments of the invention can be implemented. The embodiment shown in FIG. 2 is one such possible implementation.

Figure 2:
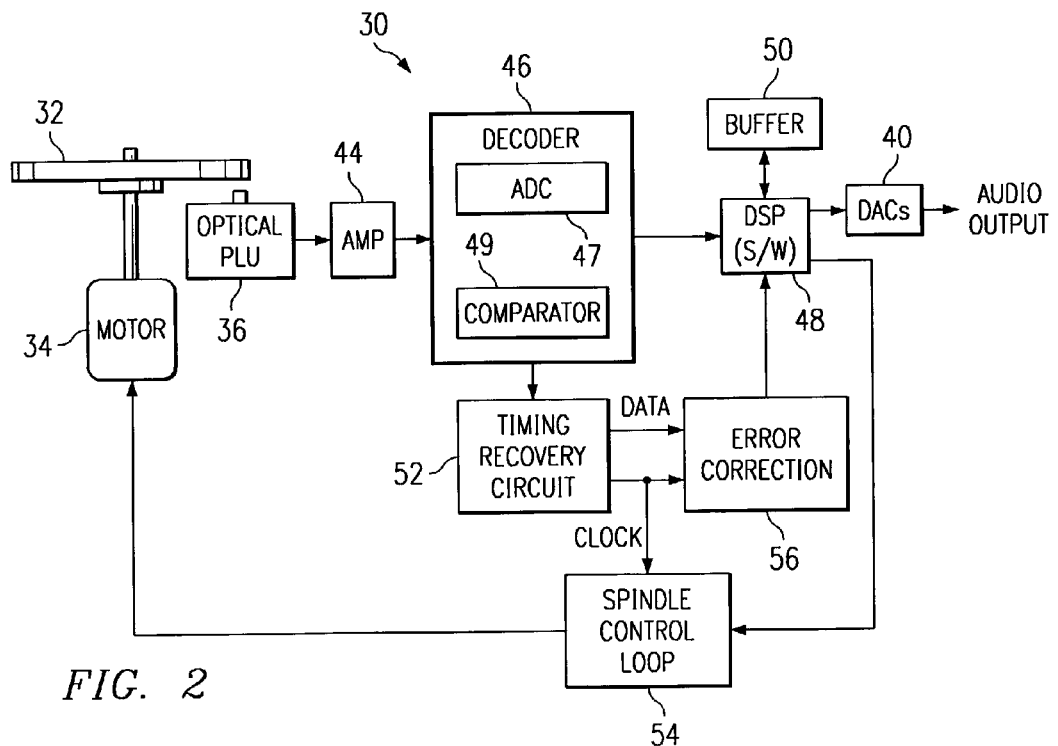
FIG. 2 shows a more detailed embodiment of the CD player of FIG. 1.

Referring now to FIG. 2, the analog signal from the optical pickup 36 is provided to an RF amplifier 44 which amplifies the signal before providing it to a decoder 46. The CD decoder 46 includes a bank of analog-to-digital converters ("ADCs") 47 and a variable threshold comparator 49 which converts the analog signal into a digital compressed bit stream. The decoder may also have one or more filters as is typical. Such filters preferably are tuned to various frequency components in the signal from the optical pickup 36. Because the CLV of the disc 32 can be varied, the frequency response of the filters preferably is programmable, which would be apparent to those of ordinary skill in the art. The digital bit stream, which is self-clocking, is then provided to a timing recovery circuit 52 which recovers the clock signal from the bit stream and provides the clock signal to a spindle control loop 54 and an error correction circuit 56. The frequency of the recovered clock signal is proportional to the data rate of the bits coming off of the CD 32. The faster the bits are read off the CD, the greater is the frequency of the recovered clock. Conversely, the slower the bits are read off the CD, the lower is the frequency of the recovered clock. The data also is provided to the error correction circuit.

The error correction circuit 56 detects and corrects any bit errors in accordance with known techniques (e.g., Reed-Solomon Error Correction). The corrected bit stream is then provided to the digital signal processor ("DSP") 48 which decompresses the bit stream and provides the decompressed bit stream to DACs 40. The DSP 48 includes or has access to a memory buffer 50 in which the compressed bit stream is temporarily stored pending decompression. The DSP 48 also runs software as would be understood by one of ordinary skill in the art, which implements some of the functionality described herein.

Referring still to FIG. 2, the spindle control 54 causes the motor to spin the CD 32 at a constant linear velocity that is programmed by DSP 48. The DSP 48 extracts the encoding rate for each file to be played from header information associated with each file and provides the encoding rate, or more preferably a value representative of the encoding rate as described below, to the spindle control loop 54. The spindle control loop 54 uses that value to cause the motor 34 to spin the CD 32 at a constant linear rate commensurate with the encoding rate of the file being played as determined by the DSP 48.

Figure 3:
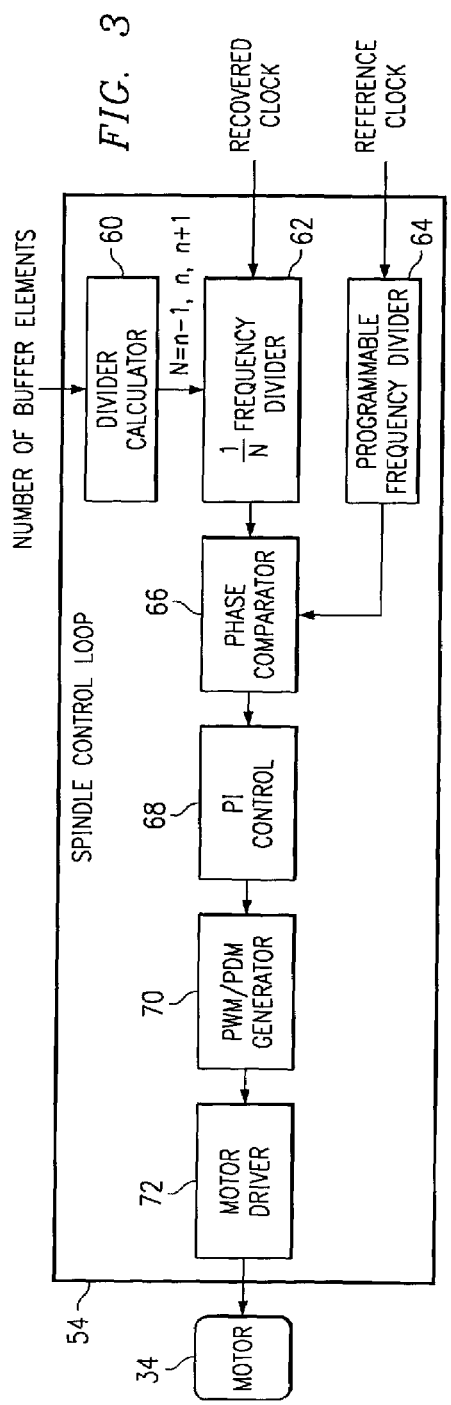
FIG. 3 illustrates a preferred embodiment of a programmable motor control used in the embodiment of FIG. 2.

FIG. 3 shows a preferred embodiment of the spindle control loop 54 comprising a divider calculator 60, frequency dividers 62 and 64, phase comparator 66, proportional-integral ("PI") controller 68, modulator generator 70, and a motor driver 72. The clock signal recovered by the timing recovery circuit 52 in FIG. 2 is supplied to the 1/N frequency divider 62 and a reference clock signal, generated in any suitable manner by the player, is supplied to a programmable frequency divider 64. The frequency dividers 62 and 64 divide down the frequency of their respective clock signals by an amount to be discussed below and the phase comparator 66 compares the divided down clocks. The phase comparator 66 compares the divided down recovered and reference clock signals (corresponding to the desired CLV) and produces an error signal that is provided to the PI controller 68. The error signal from the phase comparator 66 preferably is a waveform whose average voltage is proportional to the amount of phase difference. The goal of the spindle control loop 54 is to adjust the CLV of the disc so that divided down clocks match and the output of the phase comparator is 0 volts. A positive voltage indicates that the divided down recovered clock is faster than the divided down reference clock (or vice versa) and a negative voltage indicates that the divided down recovered clock is slower than the divided down reference clock (or vice versa). The output error signal from the phase comparator preferably is 0 volts when the two divided down frequencies are the same.

The PI controller 68 integrates the phase comparator output signal to produce, in the situation in which the divided down recovered clock is different than the divided down reference clock, a positive or negative increasing voltage. The PI controller 68 produces a positive going voltage if the divided down recovered clock is slower than the divided down reference clock. Conversely, the PI controller 68 produces a negative going voltage if the divided down recovered clock is faster than the divided down reference clock. The output signal from the PI controller 68 is provided to the modulator 70 which preferably comprises a pulse width modulator ("PWM") or a pulse density modulator ("PDM"). As such, the PWM 70 modulates the duty cycle of a pulse train in accordance with the output signal from the PI controller 68, as would be well known to those of ordinary skill in the art. A positive going signal from the PI controller 68 means that the motor 34 should be spun faster and thus the duty cycle of pulse train from the PWM 70 is increased. A negative going signal from the PI controller 68 means that the motor 34 should be spun slower and thus the duty cycle of pulse train from the PWM 70 is decreased. Motor driver 72 receives the pulse width modulated train and produces a voltage proportional to the magnitude of the duty cycle of the PWM 70 output. As such, the disc can be made to spin at a CLV.

As explained above, the CLV implemented by the spindle control loop 54 is commensurate with the encoding rate of the compressed audio file being played and is programmable to permit files of different encoding rates to be played. The reference clock is divided down by an amount commensurate with the encoding rate of the compressed audio file being played. By action of the spindle control 54, the motor 34 is caused to spin at a CLV that causes the divided down recovered clock to approximately match the divided down reference clock. That is, the spindle control 54 provides dynamic control over the reference clock taking into account the encoding rate of the data, and monitors the recovered clock while adjusting the motor speed to ensure that the motor spins at a CLV that matches the encoding rate of the data.

More specifically, the programmable frequency divider 64 is programmed by the DSP 48 to divide the reference clock by a programmable amount that takes into account the encoding rate of the file being played. As such, the DSP 48 will program the frequency divider 64 to divide the reference clock by different amounts depending on the encoding rate of the data. Preferably, the programmable frequency divider 64 divides the reference clock by a value D where D is a function of the compression ratio of the data.

The compression ratio is the encoding rate of the file divided by the encoding rate of a conventional audio CD. For example, if the encoding rate of a conventional audio CD is 1.44 megabits per second and the encoding rate of the compressed audio file is one-tenth of the encoding rate of the conventional audio CD, then the compression ratio is 1/10. In this manner, the reference clock can be adjusted to be commensurate with the encoding rate of the data. The phase comparator 66 provides the spindle control loop 54 a mechanism, by comparing the divided down recovered clock to the divided down reference clock, to effectively monitor the rotation speed of the disc so that it matches the encoding rate of the data. When these two divided down clocks match, the CD 32 is spinning at just the correct speed so that the bit stream coming off the CD can be decompressed to produce a decompressed audio stream that equals the play rate of the data itself. That is, the data is being decompressed at the rate at which the data needs to be consumed (i.e., played). Because the data is compressed on the CD, this result requires the motor 34 to spin the CD at a rate that is slower than that used for conventional CDs.

The frequency divider 62 also performs a second function. It has been observed that is not always possible to accurately control the speed of the disc to provide the desired rotation speed. If the disc spins too fast, the buffer 50 will overflow causing some audio to be missed. If the disc spins too slow, the buffer will underflow and the audio will cease to play. Thus, a mechanism is provided by which the amount of unconsumed data in buffer 50 is monitored to ensure that the buffer neither underflows or overflows. This provides a backup mechanism to control disc speed if the phase comparison technique described above fails to work properly.

Figure 4:
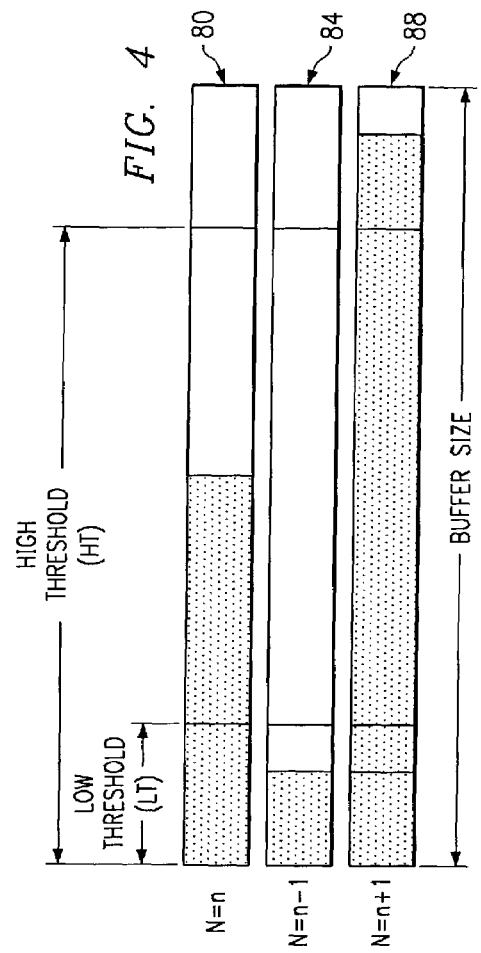
FIG. 4 illustrates buffer underrun and overrun conditions.

The frequency divider 62 preferably divides the recovered clock by N where N is n, n−1 or n+1 as will be explained below and as is explained in U.S. Pat. No. 4,603,412, incorporated herein by reference. In accordance with the preferred embodiment, the recovered clock is divided down by an amount N that can be adjusted so as to prevent the buffer 50 from underflowing or overflowing. The underflow and overflow conditions are illustrated in FIG. 4 which show lower and upper thresholds in the buffer 50. The low threshold represents a level below which the unconsumed amount of data preferably does not fall. The high threshold represents a level above which the unconsumed amount of data preferably does not rise. Reference numeral 84 depicts a near underflow condition and reference numeral 88 depicts a near overflow condition. The level of unconsumed data in the buffer 50 preferably remains between the low and high thresholds as shown in 80.

As shown in FIG. 3, N is either n, n+1 or n−1 and is determined by the divider calculator 60 upon analyzing the number of buffer elements yet to be played. A buffer element represents a block of unconsumed data in buffer 50. The memory buffer 50 has a capacity of a predetermined number of buffer elements. Via the buffer 50, the divider calculator 60 receives a value that is the number of unconsumed buffer elements remaining in the memory buffer 50. The divider calculator 60 compares this value to the high and low thresholds as shown in FIG. 4 and produces the value N for the frequency divider 62. Both thresholds preferably are predetermined based upon the overall capacity of the buffer 50.

The level of buffer elements in the buffer 50 may fall below the lower threshold, as indicated by 84, when the data is being consumed at a faster rate than it is being pulled off the CD. To prevent this buffer underrun condition, the motor should be sped up. The divider calculator 60 causes the motor speed to increase by reducing N by 1 (i.e., n−1) which causes the divided down recovered clock to be faster thereby causing the phase comparator 66 to generate a positive error signal resulting, as described above, in a motor speed increase.

On the other hand, the number of unconsumed buffer elements in buffer 50 exceeds the high threshold, as indicated by 88 in FIG. 4, when the data is being consumed at a slower rate than it is being pulled off the CD. Unless the data is pulled off the disc at a slower rate, the buffer 50 will overrun. Accordingly, in this situation the divider calculator 60 causes the motor to be slowed down by increasing n by 1 (i.e., n+1) which results in the phase comparator 66 producing a negative error signal, thereby resulting in the motor being slowed down.

Because the recovered clock frequency divider 62 divides the recovered clock by the value n, the reference clock preferably also is divided down by n to ensure proper operation of the phase comparator 66. Accordingly, the value of D noted above, which is used to divide down the reference clock, preferably is n divided by the compression rate which also equals:

$$D = \frac{n}{\frac{\text{encoding rate of compressed file}}{\text{conventional bit rate}}}$$

As described herein, the preferred embodiments of the invention include a CD player that is capable of playing conventional CDs having uncompressed audio stored thereon as well as compressed audio CDs (e.g., MP-3 discs). With conventional CDs, the CD is spun at fixed CLV so that the data is pulled off the disc at the rate at which it needs to be consumed. When compressed audio CDs are played, the data is pulled off the disc at a slower rate than for conventional CDs and at a rate that is equal to, or a function of, the encoded play rate of the data on the disc. The compressed data is pulled off the disc and decompressed at a rate at which it needs to be consumed. The compressed audio CD is still spun at a constant linear velocity while it plays a compressed audio file, but the speed can be varied between CDs and even between files depending on the encoded play rate associated with each file and/or CD.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A compressed audio player, comprising:
an optical pickup;
processing logic coupled to said optical pickup and receiving a compressed bit stream from said optical pickup;
a programmable motor control coupled to said processing logic; and
a motor coupled to said programmable motor control;
wherein said processing logic determines the encoding rate of compressed audio on the disc and programs the programmable motor control to operate the motor so as to spin a disc at a constant linear velocity that is a function of the encoding rate of the compressed audio; and
wherein said programmable motor control includes a programmable frequency divider that divides down a reference clock by a division factor determined by said processing logic.

2. The compressed audio player of claim 1 wherein said factor is a function of said encoding rate.

3. The compressed audio player of claim 1 further including a second frequency divider that divides down a recovered clock signal, said recovered clock signal extracted from the compressed audio on the disc, and further including a phase comparator that compares the phases of the divided down reference clock and the divided down recovered clock to produce an error signal.

4. The compressed audio player of claim 1 wherein said factor is a function of the compression ratio of said compressed audio.

5. A method of playing compressed audio files from a CD being spun at a constant linear velocity by a motor, comprising the steps of:
   (a) retrieving compressed audio data from the CD;
   (b) determining the encoding rate of said compressed audio data; and
   (c) adjusting the constant linear velocity of the motor according to the encoding rate of said compressed audio data, said adjusting step including
       (1) recovering a clock signal from compressed audio data from the CD,
       (2) dividing a reference clock signal by a division factor,
       (3) comparing the phase of the divided reference clock signal with the phase of the recovered clock signal to produce an error signal,
       (4) controlling the constant linear velocity of the motor according to said error signal, and
       (5) controlling the division factor to minimize said error signal.

6. The method of claim 5 further including performing (a), (b) and (c) for at least two files on the CD wherein the constant linear velocity in (c) is different for the files.

7. A programmable motor control, comprising:
   a first frequency divider which receives a recovered clock from a compressed audio bit stream;
   a second frequency divider which receives a reference clock;
   a phase comparator which compares the divided down frequencies from the first and second dividers;
   wherein said phase comparator produces an average output voltage relative to the phase difference of the divided down frequencies from the first and second frequency dividers; and
   wherein the second frequency divider is programmed to divide down the reference clock by an amount that is a function of the encoding rate of the compressed audio bit stream.

8. The motor control of claim 7 wherein said amount is received by said second frequency divider by logic external to said motor control.

9. The motor control of claim 7 further including a motor driver which causes a motor to operate at a speed that causes the divided down recovered clock to approximately equal the divided down reference clock.

10. The compressed audio player of claim 1, wherein:
    said processing logic is further operable to
        read encoding rate data indicative of an encoding rate from the compressed bit stream, and
        determine the division factor from the encoding rate data.

11. The compressed audio player of claim 10, wherein:
    said processing logic reads said encoding rate data from a header of a compressed audio file read by said optical pickup.

12. The compressed audio player of claim 1, further comprising:
    a buffer memory; and
    wherein said processing logic is further operable to
        decompress the compressed bit stream from said optical pickup into a decompressed bit stream,
        write the decompressed bit stream in said buffer memory,
        control read out of the decompressed stream from said buffer memory,
        determine a fullness of said buffer memory, and
        modify said division factor dependent upon the fullness of said buffer memory.

13. The compressed audio player of claim 12, wherein:
    said programmable logic is further operable to
        increment the division factor if an amount of data stored in said buffer memory is greater than a high threshold, and
        decrement the division factor if an amount of data stored in said buffer memory is less than a low threshold.

14. The method of claim 5, further comprising the step of:
    (d) reading encoding rate data indicative of an encoding rate from the compressed bit stream; and
    wherein said step (c) of adjusting the constant linear velocity of the motor includes determining an initial division factor from the encoding rate data.

15. The method of claim 14, wherein:
    said step (d) of reading encoding rate data reads said encoding rate data from a header of a compressed audio file.

16. The method of claim 5, further comprising the steps of:
    (d) decompressing the compressed bit stream from the CD into a decompressed bit stream;
    (e) writing the decompressed bit stream into a buffer memory;
    (f) controlling read out of the decompressed stream from the buffer memory;
    (g) determining a fullness of the buffer memory; and
    (h) modifying the division factor dependent upon the fullness of the buffer memory.

17. The compressed audio player of claim 16, wherein:
    said step (h) of modifying the division factor includes
        incrementing the division factor if an amount of data stored in said buffer memory is greater than a high threshold, and
        decrementing the division factor if an amount of data stored in said buffer memory is less than a low threshold.

* * * * *